United States Patent [19]

Liebert et al.

[11] Patent Number: 4,553,390
[45] Date of Patent: Nov. 19, 1985

[54] HYDROSTATIC STEERING ARRANGEMENT

[75] Inventors: Karl-Heinz Liebert, Schwäbisch Gmünd; Werner Tischer, Heubach-Lautern; Rolf Fassbender, Mutlangen, all of Fed. Rep. of Germany

[73] Assignee: Zahnradfabrik Friedrichshafen, AG., Friedrichshafen, Fed. Rep. of Germany

[21] Appl. No.: 662,700

[22] Filed: Oct. 19, 1984

Related U.S. Application Data

[63] Continuation of Ser. No. 391,606, Jun. 24, 1982, abandoned.

[30] Foreign Application Priority Data

Jul. 3, 1981 [DE] Fed. Rep. of Germany ....... 3126226

[51] Int. Cl.⁴ .......................... F15B 9/10; B62D 5/06
[52] U.S. Cl. ........................ 60/384; 60/468; 137/493.9; 180/132
[58] Field of Search ............... 60/384, 385, 387, 460, 60/461, 462, 465, 466, 468, 470, 472, 494; 91/420, 463, 468; 137/493, 493.9; 180/132, 154, 155, 156, 157, 158, 159, 160

[56] References Cited

U.S. PATENT DOCUMENTS

| | | | |
|---|---|---|---|
| 2,328,979 | 9/1943 | Herman et al. | 91/463 |
| 3,472,261 | 10/1969 | Brannon | 91/420 |
| 3,497,032 | 2/1970 | Schott | 180/160 |
| 3,518,829 | 7/1970 | Kamner | 60/462 |
| 4,044,791 | 8/1977 | McKenzie | 137/493.9 |
| 4,144,947 | 3/1979 | Withers et al. | 180/132 |
| 4,228,866 | 10/1980 | Naumann | 180/132 |
| 4,349,041 | 9/1982 | Bates | 91/420 |

FOREIGN PATENT DOCUMENTS

2061868 7/1972 Fed. Rep. of Germany ........ 60/385

Primary Examiner—Charles T. Jordan
Assistant Examiner—Richard Klein
Attorney, Agent, or Firm—Zalkind & Shuster

[57] ABSTRACT

A hydrostatic steering system having a hand operated metering pump and steering control valve regulating and distributing fluid flow from a servo pump to a piston servomotor of the differential pressure surface type. A compensation valve disposed in the pressure line leading to one of the opposed chambers of the piston servomotor, is actuated by a differential pressure surface dimensioned to establish a constant ratio of pressures prevailing in the opposed pressure chambers in the neutral steering position while the metering pump is ineffective to produce any differential pressure. During active steering, the compensation valve is bypassed through a check valve.

17 Claims, 6 Drawing Figures

HYDROSTATIC STEERING ARRANGEMENT

This is a continuation of application Ser. No. 391,606 filed Jun. 24, 1982 now abandoned.

BACKGROUND OF THE INVENTION

This invention relates to improvements in a hydrostatic steering system having an unbalanced piston servomotor to which pressurized fluid, regulated by a metering pump, is fed from a steering control valve.

Hydrostatic steering systems of the foregoing type are commonly used, for example, in heavy construction vehicles such as loaders, excavators, tractors, stackers, etc. Mechanical steering rod mechanisms for such vehicles have been replaced by oil or fluid column devices for steering force transmission which may be manually operated in the absence of hydraulic support. Steering arrangements of such type are described, for example, in German patent publications No. 1,550,557 and OS No. 27,49,353.

The metering pump associated with the foregoing type of fluid steering system usually includes a rotor enclosed by an internally toothed stator in mesh with external teeth on the rotor. Fluid displacing pockets are formed between the meshing teeth profiles of the pump rotor and stator and a slide control valve is rotated in synchronism with the pump rotor to control distibution of fluid metered by the pump rotor all in response to rotational movement imparted to a hand steering wheel. The fluid is pressurized by a powered pump. Thus, fluid powered steering of dirigible vehicle wheels is synchronized with angular movement of the hand steering wheel, the wheels being turned by piston operating rods extending from fluid piston servomotors. Because of the use of such piston operating rods, each piston servomotor has differential piston area surfaces exposed to opposed pressure chambers.

In order to prevent cavitation in the fluid supply conduits extending to the piston servomotors, one-way check valves are usually built into such pressure conduits. Where the power pump for the steering system serves other fluid operated systems for example, the pressure therein may effect opening of the one-way check valves to pressurize the supply conduits in response to development of a pressure head in the return line to the fluid reservoir in the neutral position of the steering control valve. This condition may also occur because of an accumulation of excessive fluid (due to an increase in flow-through resistance). As a result of the differential piston area surfaces in the servomotor, the servomotor will be unbalanced by a pressure force exerted in the direction of the smaller piston area surface, causing an increase in pressure in associated supply conduit and closing of the check valve therein. The pressure increase caused by the foregoing condition will drive the metering pump and circulate fluid as a motor to equalize the fluid volumes in the opposed pressure chambers of the servomotor by opening of a check valve to supply fluid from the larger surface pressure chamber to the smaller surface pressure chamber. Thus, a "run-away" action of the servomotor occurs, dependent on the pressure head developed in the return line, that is felt by the vehicle driver through the hand steering wheel in the neutral position as a sudden wheel turning force inducing the driver to apply a compensating counterforce.

It is therefore an important object of the present invention to provide a hydrostatic steering system of the aforementioned type, wherein pressure heads developed in the neutral position of the steering control valve will not create unintentional forces applied to the piston servomotor.

SUMMARY OF THE INVENTION

In accordance with the present invention, a compensation valve assembly is connected to one of the supply conduits from the steering control valve to the smaller volume chamber of the piston servomotor of a hydrostatic steering system to establish a constant ratio between the pressures respectively prevailing in the servomotor chambers in the neutral position of the control valve. The compensation valve is by-passed through a check valve when the control valve is displaced from the neutral position to initiate a steering operation.

The compensation valve assembly has a piston actuator of the differential pressure surface type arranged in inverse relation to the differential area surfaces of the servomotor piston to compensate for unbalance by restricting exhaust flow. Thus, in the absence of any differential pressure applied through the metering pump, the servomotor piston cannot be displaced. However, because of the by-pass flow action of the check valve, flow of pressurized fluid to the servomotor is not restricted during the steering operation. Further, the compensation valve assembly does not influence return motion of the vehicle wheels from the full turn angle to straight-ahead travel positions since the return force is maintained independent of differential pressure surfaces.

The development of any return line pressure head in the neutral position of the system caused by other fluid operated devices as aforementioned is applied to one side of the piston actuator of the compensation valve, opposed by the pressure supplied to the smaller volume chamber of the piston servomotor.

According to one embodiment, the compensation valve and check valve are disposed in a common valve housing. In such case, an annular piston is provided having different diameter end portions and an internal passage closed at one axial end by a spring loaded spherical valve element while the other end is subject to a possible pressure head. By appropriate design of diameter differential for the annular piston and the spring pressures exerted thereon, equality may be achieved between the "pressure head" line and the pressure line extending from the smaller volume chamber of the piston servomotor through the metering pump to the control valve.

BRIEF DESCRIPTION OF DRAWING FIGURES

Other advantages and modifications of the invention will become apparent from a more detailed description hereinafter referring by way of example to the accompanying drawings, wherein.

DETAILED DESCRIPTION OF PREFERRED EMBODIMENTS

Figure 1:
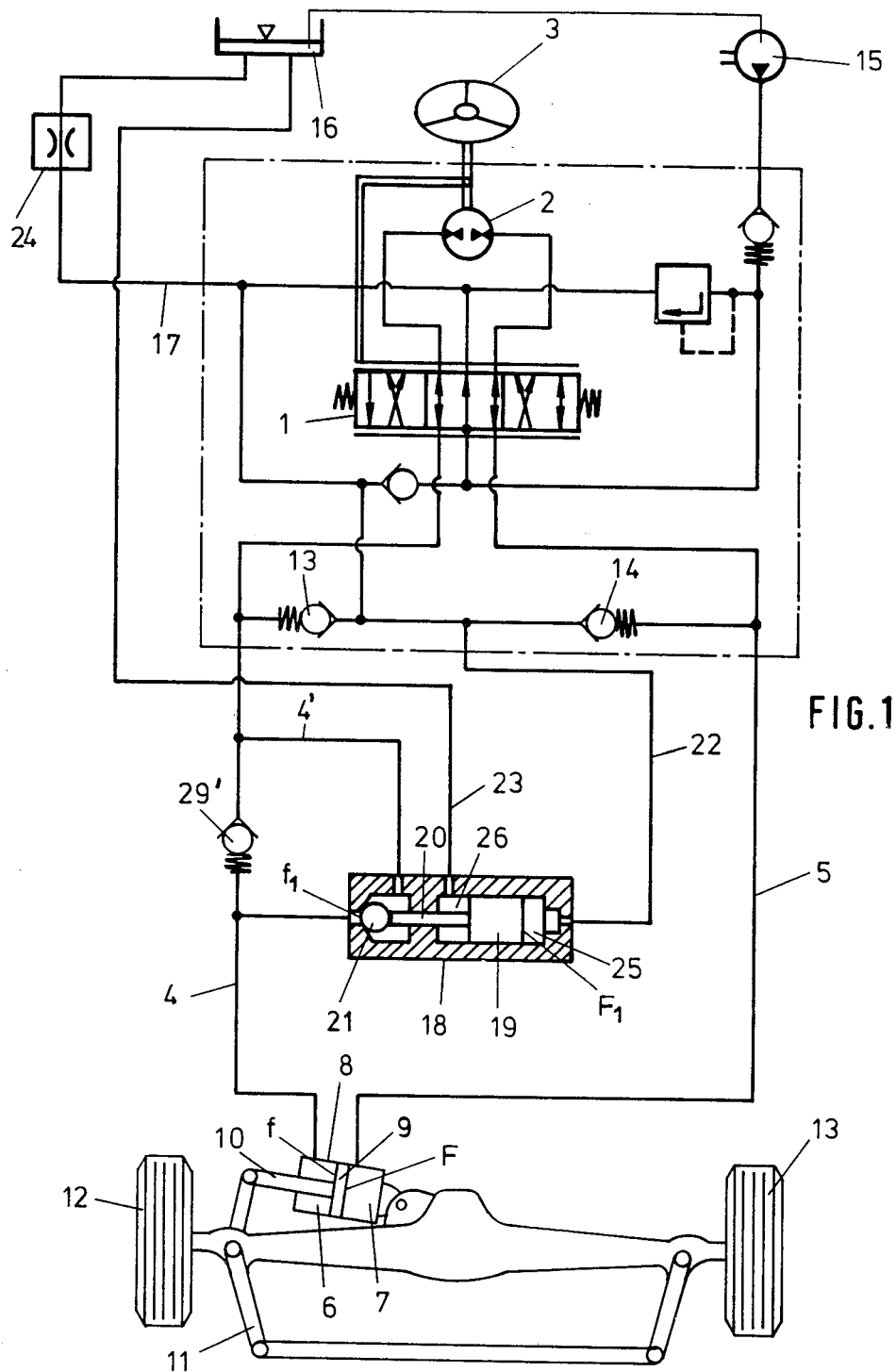
FIG. 1 is a fluid circuit diagram schematically illustrating the hydrostatic steering system in accordance with the invention.

A hydrostatic steering system in accordance with the present invention is schematically depicted in FIG. 1 and includes a steering control valve 1 operatively associated with a metering pump 2 connected to a hand steering wheel 3. Outlet pressure conduits 4 and 5 extend from the steering control valve 1 to the opposing pressure chambers 6 and 7 of a fluid servomotor 8 within which a piston 9 is mounted. An operating piston rod 10 extends from the piston to a steering linkage 11 for turning of vehicle wheels 12 and 13. In view of the extension of the piston rod 10 from piston 9, the effective piston surface exposed to pressure chamber 6 is smaller than the effective piston surface exposed to chamber 7. The pressure lines 4 and 5 connected to the pressure chambers 6 and 7 have one-way check valves 13 and 14 associated therewith to minimize cavitation. The steering system is supplied with a pressurized operating medium or fluid by means of a pump 15, the fluid being drawn from a reservoir tank 16 to which a return fluid line 17 is connected. The construction and operation of the foregoing hydrostatic steering system is generally well known and will be briefly referred to hereinafter.

The steering control valve 1 includes the usual valve housing formed with a valve bore within which a control valve element is axially displaceable and rotatable. Radially and axially extending valve grooves are formed in the valve body in fluid communication with the valve bore through associated passages. Axial displacement of the control valve element effects regulation of the operating pressure as well as directional reversals of flow dependent on the rotational direction in which the hand steering wheel is displaced. Rotational movement of the hand steering wheel also effects flow distributing control of the metering pump 2. The control valve element is rotationally coupled by a drive shaft to the rotor of the metering pump and is also operatively connected to the steering spindle from the hand wheel 3 in order to support the generally well known operation of a fluid power steering system. Thus, in response to turning of the hand steering wheel 3, the steering control valve element is correspondingly displaced in order to conduct flow from the fluid pressure pump 15 to the intake side of the metering pump 2. From the metering pump 2, flow of fluid proportional to turning movement of the hand steering wheel 3 is fed to a corresponding pressure chamber of the fluid servomotor 8.

In accordance with the present invention, a valve assembly 18 establishes a flow path through the pressure line 4 to pressure chamber 6. Valve assembly 18 may be bypassed by means of a one-way check valve 29 during active steering operation. In the embodiment illustrated in FIG. 1, the valve assembly 18 includes a piston 19 from which a pin 20 extends in one axial direction. The pin 20 at its end remote from piston 19, engages a ball valve element 21. When seated in the valve housing of valve assembly 18, the ball element 21 blocks flow to the pressure line 4. A return line 17 is in communication with a pressure chamber 25 on one axial side of the piston 19 through a line 22 and with the steering control valve 1. The other axial end of the piston 19 is exposed to a pressure chamber 26 in fluid communication with the reservoir tank 16 independently of return line 17 through line 23. A flow restrictor 24 which may represent another fluid operated device as aforementioned in connection with the prior art, is inserted in return line 17 so that any pressure head developed within the return line as a result of loading of the other fluid operated device initiates operation of the valve assembly 18. Such static pressure head developed externally of the valve assembly 18 is communicated with chamber 25 through line 22 on one axial side of the piston 19, the other axial side being exposed to the low reservoir pressure in chamber 26 connected by line 23 to the reservoir tank 16. The resulting valve closing force $F_1$ applied to the piston 19 is transmitted by pin 20 to the ball valve element 21 to which an opening pressure force $f_1$ is applied by the fluid pressure in pressure line 4. By appropriate coordination of such pressure forces $F_1$ and $f_1$ with the valve geometry, the fluid pressures in lines 4 and 5 respectively applied to the opposed pressure chambers 6 and 7 may be balanced. In this manner, development of differential pressure forces on the piston 9 ordinarily generated by operation of the metering pump 2 is avoided to prevent "run away" operation of the servomotor 8. Also, the affect of the external pressure head on the valve closing force F1 avoids the tendency of the small servomotor chamber 6 to contract.

It will be apparent from the arrangement illustrated in FIG. 1, that in the neutral position of control valve 1 the valve assembly 18 may be designed to produce the relationship:

$$\frac{P_1}{P_2} = \text{Constant}$$

where $P_1$ is the pressure in chamber 6, and $P_2$ is the pressure in chamber 7. During steering operation with control valve 1 displaced in a right hand direction, the one-way check valve 29 opens in order to conduct unrestricted flow of pressurized fluid from pump 15 to pressure chamber 6 of the servomotor 8, bypassing the valve assembly 18.

The fluid communication established by line 23 as shown in FIG. 1 between chamber 26 of the valve assembly 18 and the reservoir tank 16 is advantageous in eliminating fluid leakage. However, chamber 26 could instead be connected to atmosphere where such leakage is to be tolerated. The valve assembly 18 in actual practice, thereby effects a reduction in pressure $P_1$ in chamber 6 toward that of the pressure $P_2$ in chamber 7 or to the pressure head in return line 17. The valve assembly 18 therefore tends to balance a pressure in cooperation with the restrictor 24 in the return line 17 while control valve 1 is displaced from the nejtral position.

FIGS. 2–6 illustrate a specific embodiment of the valve assembly 18. The valve assembly 18 includes a valve housing 27 within which an annular piston 28 is mounted for axial displacement. The one-way check valve corresponding to 29 in FIG. 1, is incorporated within the housing 27 of the valve assembly 18 and includes a ball valve element 29' engageable with one axial end of the annular piston 28 in order to close a passage bore 30 formed therein. Thus, the ball valve element 29' performs the function of one-way check valve 29 as schematically shown in FIG. 1. The pressure line 4 and its branch line 4' are connected to the valve housing 27 by means of threaded fittings 31 and 32 so as to establish the operational relationship between the valve assembly 18 and check valve 29 as diagrammed in FIG. 1. The outside diameter of the annular piston 28 is smaller adjacent that axial end engaged by the ball valve element 29' opposite the larger diameter end portion opening toward the branch pressure line 4'. The return line 23 extends into the valve housing 27 at a location intermediate the opposite end portions of the annular piston 28 to establish fluid communication with the reservoir tank 16. The annular piston is biased in one axial direction toward the ball valve element 29' by a spring 34 reacting against the valve housing 27 by means of a ring 33. The axial end of the spring 34 opposite the end engaging ring 33 engages an internal shoulder 35 of the annular piston 28. An annular bead 35' is formed at the axial end of the annular piston from which the spring 34 extends so as to be engageable with an internal stop shoulder 36 formed in the valve housing 27.

Figure 6:
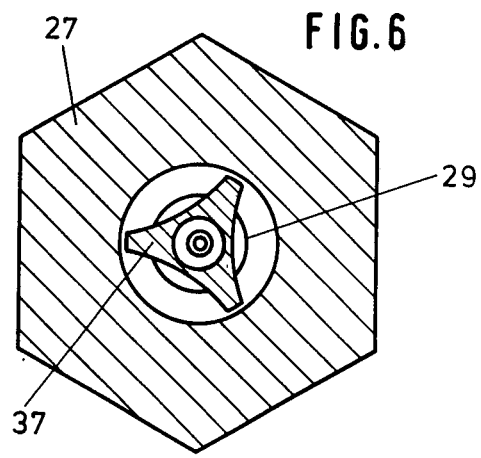

The ball valve element 29' on the axial side thereof opposite the annular piston 28, is provided with a stop member 37 that is substantially triangular in shape, as more clearly seen in FIG. 6. The triangular configuration of the stop member is such that axial flow is not blocked while the corners of the stop member are engaged with a stop shoulder surface 38 formed in the valve housing 27.

The ball valve element 29' is furthermore provided with a pin 39 slidably received within the center bore of a holding ring 40. A compression spring 41 is held in a compressed condition between the ring 40 and the stop member 37. The holding ring 40 is formed with several opening passages 42 in order to permit the flow of fluid therethrough and is held assembled between the end of the pressure line 4 and an internal shoulder formation in the valve housing 27. The configuration of the holding ring 40 is shown in greater detail in FIG. 5. As a result of the passage bore 30 formed in the annular piston 28, a separate line 22 to the return line 17 as shown in FIG. 1, may be omitted since the pressure head that may develop therein would be communicated through check valve 13 and prevail in branch pressure line 4'.

Figure 2:
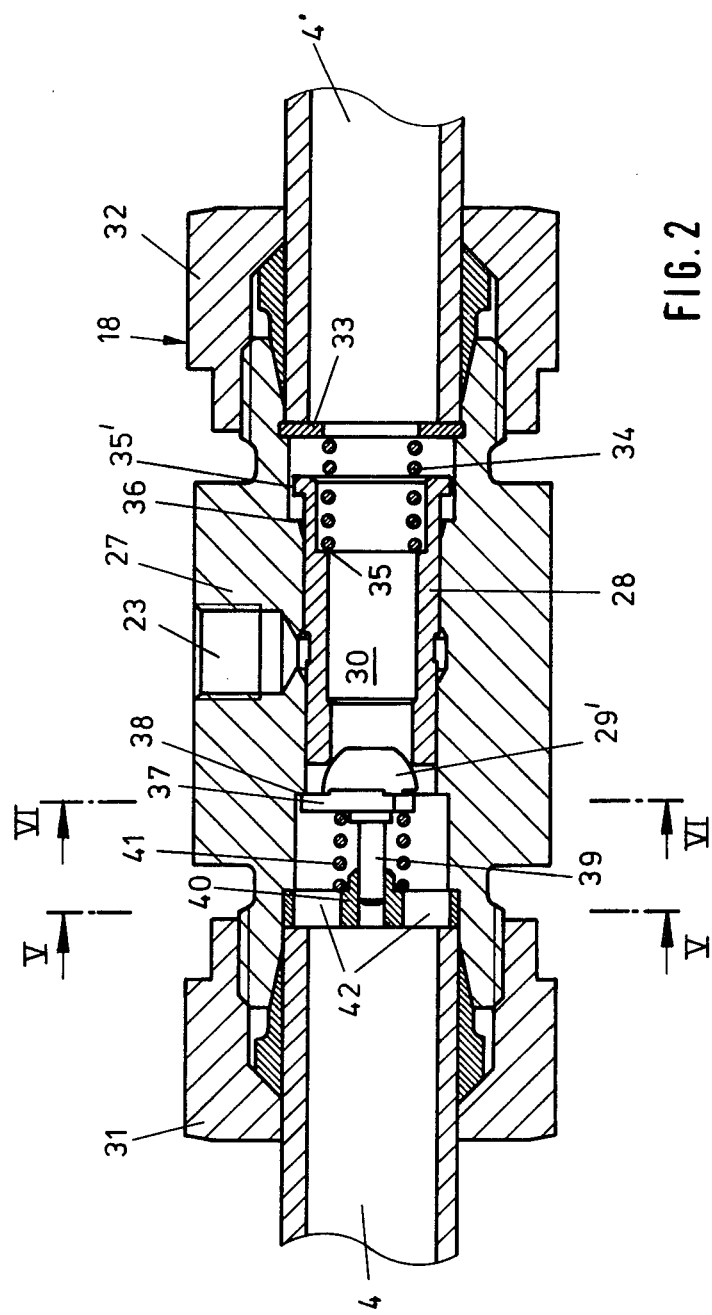
FIG. 2 is a longitudinal section view of a valve assembly in a neutral position in accordance with one embodiment of the invention, forming part of the hydrostatic steering system.
Figure 3:
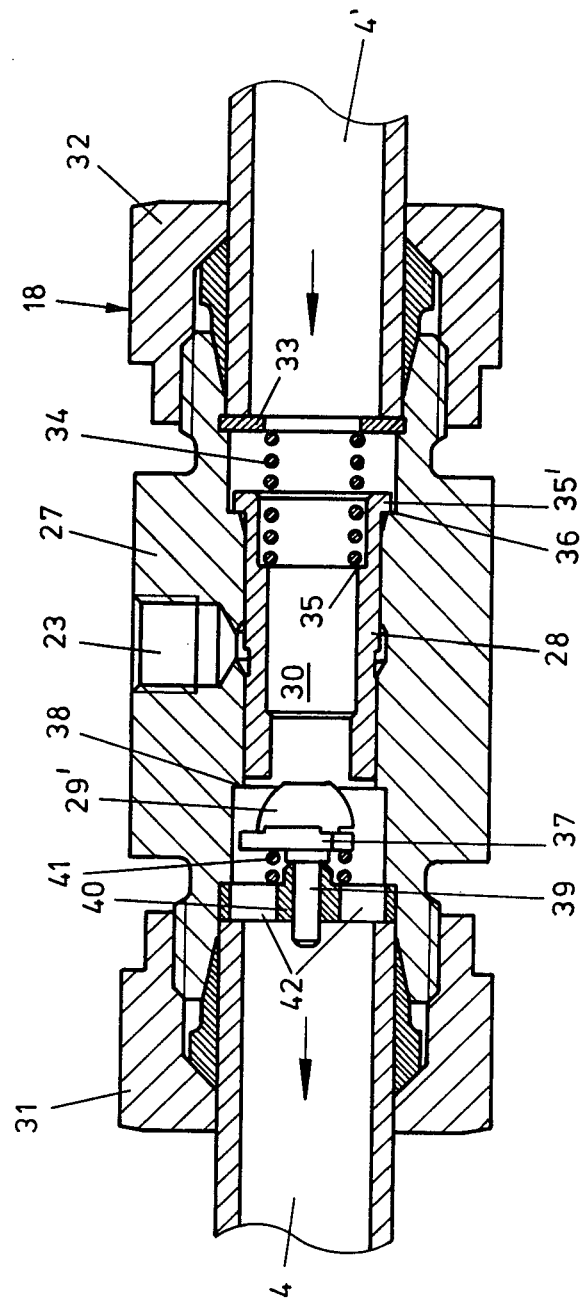
FIGS. 3 and 4 are longitudinal section views similar to FIG. 2, respectively showing the valve assembly in positions corresponding to a steering action and the occurrence of a pressure head.

FIG. 2 illustrates the valve assembly 18 in its neutral position while there is no pressure head present so that the ball valve element 29' blocks flow to the pressure line 4 under the bias of spring 41. FIG. 3 illustrates the valve assembly 18 during an active steering operation in which the ball valve element 29' is opened by a pressure head in branch line 4' communicating with the ball valve element through bore passage 30 in the annular piston 28. At the same time, the bead 35' of the annular piston is engaged with the stop surface 36 in the valve housing 27. The stop member 37 on the ball valve element 29', on the other hand, is displaced from engagement with the stop shoulder 38 of the valve housing. As a result, unrestricted flow of pressurized fluid is conducted through the valve assembly 18 to the pressure line 4. The foregoing operation of the valve assembly 18 requires that the axial stroke of the annular piston 28 be shorter than axial opening displacement of the ball element 29'.

Figure 4:
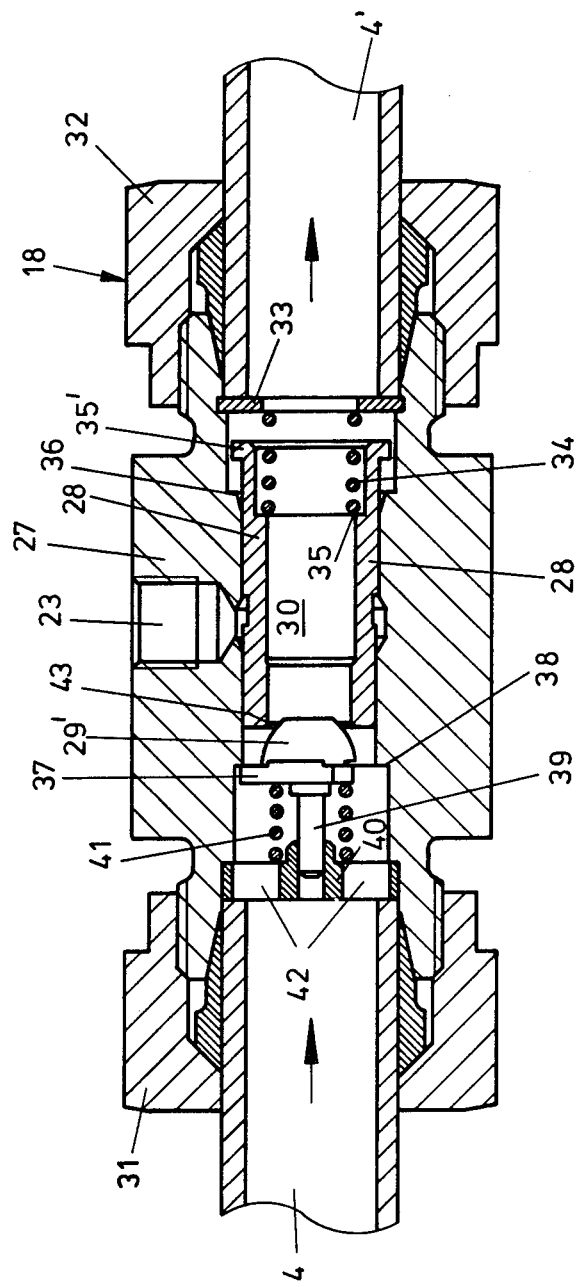
Figure 5:
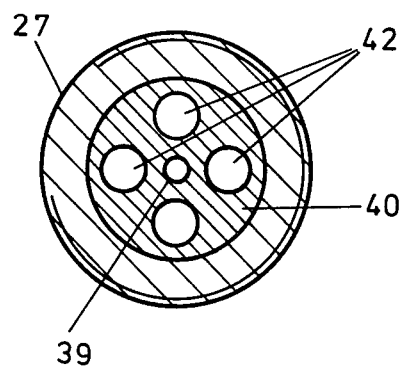
FIGS. 5 and 6 are transverse section views respectively taken through section lines V—V and VI—VI in FIG. 2.

FIG. 4 illustrates the valve assembly 18 in a functioning position arising by virtue of the development of a pressure head in the return line 17 while the steering control valve is in its neutral position. Depending on the prevailing pressure in servomotor chamber 6 and in return line 17 under such conditions, the annular piston 28 will be axially positioned between the stop shoulder 36 and the ring 33 determined by the bias of the springs 41 and 34 and the pressure prevailing in line 23. Thus, a pressure head communicated through branch line 4' will be opposed by a higher pressure in line 4 to cause valve piston 28 to be displaced somewhat to the right as viewed in FIG. 4. At the same time the ball valve element 29' will be held in an axial position by the stop member 37 abutting the stop shoulder 38 in the valve housing 27. Further, in such a situation, it is essential for proper functioning that the maximum displacement of the ball valve element 29' be less than that of the annular piston 28 in the same right hand direction so that an annular gap 43 is formed between the ball valve element and the adjacent axial end of the annular piston to conduct a restricted flow of fluid through the passage bore 30 between lines 4 and 4' as indicated by the arrows in FIG. 4. Thus, the ball valve element 29' has a dual function of operating as the one-way check valve 29 according to FIG. 1, as well as to assume the function of the flow blocking ball valve element 21 shown in FIG. 1. Stated otherwise, the ball valve element 29' as shown in FIG. 4, performs the function of the ball valve element 21 of FIG. 1 and at the same time performs the function of the ball valve element 29' in the position shown in FIG. 2. The ball valve element 29' and the adjacent axial end of the annular piston 28 furthermore form a controlled flow restrictor through which the pressure $P_1$ in chamber 6 of the servomotor 8 is reduced toward the $P_2$ pressure in the servomotor chamber 7. The valve assembly 18 thereby acts as a "compensation valve" for the differential piston servomotor 8 in order to equalize pressure forces acting on the piston surfaces.

We claim:

1. In a hydrostatic steering system having a differential surface piston servomotor subject to displacement by an uncontrollable pressure head in a neutral flow circulating position of a steering control valve through which pressurized fluid is supplied to one of two opposed pressure chambers of the servomotor for steering operation in response to displacement of the steering control valve from the neutral position, the improvement including compensation valve means responsive to said pressure head for maintaining a constant ratio of pressures in the opposed pressure chambers in the neutral position of the steering control valve, and means responsive to said steering operation for conducting the pressurized fluid to the servomotor in by-pass relation to the compensation valve means, the compensation valve means establishing the constant ratio of pressures at a value to balance forces acting on the piston servomotor by having differential pressure faces ($f_1$, $F_1$) on which valve opening and closing forces are respectively exerted by pressures in the opposed pressure chambers (6, 7) of the servomotor (8) and a reservoir pressure chamber (26) maintaining a pressure bias on the compensation valve means opposing the valve closing force exerted on one of the differential pressure faces.

2. In a hydrostatic steering system having a steering control valve displaceable from a neutral position to effect steering operation, a metering pump, a hand steering wheel operatively connected to the metering pump to regulate flow of pressurized fluid through the steering control valve, a servomotor, a servopump from which the pressurized fluid is supplied to the servomotor, the sevvomotor including a piston provided with differential area surfaces respectively exposed to opposed pressure chambers (6, 7) and a pressure conduit (4) conducting the pressurized fluid from the steering control valve to one of the opposed pressure chambers to which the smaller of the differential area surfaces is exposed, the improvement comprising compensation valve means (18) operatively connected to the pressure conduit for conducting pressurized fluid therein in one direction from said one of the opposed chambers of the servomotor (8) and check valve means responsive to said steering operation for conducting the pressurized fluid to the servomotor through the pressure conduit in bypass relation to the compensation valve means, the compensation valve means (18) including a differential pressure piston having differential pressure faces ($f_1$, $F_1$) respectively exposed to valve opening pressure in the outlet pressure conduit (4) and valve closing pressure in the other of the opposed pressure chambers of the servomotor and a reservoir pressure chamber (26) maintaining a bias on the piston opposing the valve closing pressure on one of the pressure faces ($F_1$).

3. The system as defined in claim 2, including a common valve housing (27) for the compensation valve means (18) and the check valve means (29').

4. The system as defined in claim 3, including a branch conduit (4') connected to said compensation valve means (18) establishing a flow path bypassed by said check valve means and fittings (31, 32) connecting the pressure conduit (4) and branch conduit to the valve housing (27).

5. The system as defined in claim 4, wherein the housing is provided with an assembly formation axially spaced from the pressure conduit, and a holding ring (40) held clamped between the pressure conduit and the assembly formation.

6. In a hydrostatic steering system having a steering control valve displaceable from a neutral position to effect steering operation, a metering pump, a hand steering wheel operatively connected to the metering pump to regulate flow of pressurized fluid through the steering control valve, a servomotor, a servopump from which the pressurized fluid is supplied to the servomotor, the servomotor including a piston provided with differential area surfaces respectively exposed to opposed pressure chambers, and an outlet pressure conduit conducting the pressurized fluid from the steering control valve to one of the opposed pressure chambers (6) to which the smaller of the differential area surfaces is exposed, the improvement comprising compensation valve means (18) operatively connected to the pressure conduit (4) for establishing a constant ratio between pressures respectively prevailing in the opposed chambers (6, 7) of the servomotor (8) in said neutral position of the steering control valve (1) and check valve means (29) responsive to said steering operation for conducting the pressurized fluid to the servomotor through the pressure conduit in bypass relation to the compensation valve means, the compensation valve means (18) including a valve housing (27), an annular piston (28) diplaceable within the housing and having opposite axial end portions of different outside diameters and an internal passage (30) and means for conducting pressurized fluid between one of the end portions of the annular piston having a smaller outside diameter and said one of pressure chambers (6) of the servomotor (8), said check valve means comprising a spring biased valve (29') operated in response to a pressure head applied thereto through the internal passage from the larger diameter end portion of the annular piston.

7. The system as defined in claim 6, wherein the spring biased valve (29') is displaced by the pressure head by a maximum amount which is less than axial displacement of the annular piston (28) in a closing direction relative to the spring biased valve.

8. The system as defined in claim 6, wherein maximum displacement of the annular piston (28) is less in a valve opening direction than opening displacement of the spring biased valve (29').

9. The system as defined in claim 6, wherein said annular piston includes a peripheral surface portion intermediate said opposite axial end portions, and a low pressure return reservoir (16) in fluid communication with said intermediate peripheral surface portion of the annular piston.

10. The system as defined in claim 6, wherein the compensation valve means further includes a holding ring (40) guiding axial movement of the spring biased valve (29') and provided with axial flow passages (42).

11. The system as defined in claim 10, wherein the spring biased valve includes a valve element having a pin (39) slideably received in the holding ring (40) and a compression spring (41) disposed between the valve element and the holding ring.

12. The system as defined in claim 11, including a stop (38) formed in the valve housing to limit displacement of the valve element (29').

13. The system as defined in claim 12, wherein the valve element (29') is provided with a spherical surface engageable with the annular piston at the smaller diameter end portion.

14. The system as defined in claim 12, including a stop member (37) mounted on the valve element to limit axial displacement thereof.

15. The system as defined in claim 14, wherein the stop member (37) has a triangular configuration engageable with a stop surface (38) in the valve housing.

16. The system as defined in claim 6, including spring means (34) for biasing the annular piston in a direction toward the spring biased valve (29').

17. The system as defined in claim 16, including an annular bead (35') formed on the annular piston to limit displacement thereof at the larger diameter end portion and a stop formation (36) in the valve housing engageable by said annular bead.

* * * * *